United States Patent [19]
Lareau et al.

[11] Patent Number: 5,155,597
[45] Date of Patent: Oct. 13, 1992

[54] ELECTRO-OPTICAL IMAGING ARRAY WITH MOTION COMPENSATION

[75] Inventors: Andre G. Lareau, Bloomingdale; Stephen R. Beran, Mount Prospect; John A. Lund, McHenry; William R. Pfister, Schaumburg, all of Ill.

[73] Assignee: Recon/Optical, Inc., Barrington, Ill.

[21] Appl. No.: 619,219

[22] Filed: Nov. 28, 1990

[51] Int. Cl.⁵ .................... H04N 3/14; H04N 5/335; H04N 5/228; H04N 7/18
[52] U.S. Cl. ..................... 358/213.24; 358/109; 358/222; 358/213.26; 358/213.27; 358/213.31; 358/212; 250/578.1
[58] Field of Search ............ 358/222, 109, 108, 209, 358/213.11, 213.24, 213.31, 213.25, 213.28, 212, 213.19, 213.27, 213.26, 213.29, 87, 88; 357/24 LR; 250/578.1

[56] References Cited

U.S. PATENT DOCUMENTS

| | | | |
|---|---|---|---|
| 3,833,762 | 9/1974 | Gudmundsen | |
| 3,982,255 | 9/1976 | Orlando | 354/70 |
| 4,152,729 | 5/1979 | Hobbs et al. | 358/222 |
| 4,157,218 | 6/1979 | Gordon et al. | 354/66 |
| 4,245,254 | 1/1981 | Svensson et al. | 358/222 |
| 4,303,945 | 12/1981 | Fawcett et al. | 358/222 |
| 4,505,559 | 3/1985 | Prinz | 354/66 |
| 4,600,283 | 7/1986 | Gorsch et al. | 354/66 |
| 4,616,911 | 10/1986 | Zeth et al. | 354/66 |
| 4,654,876 | 3/1987 | Atkins | 382/54 |
| 4,661,849 | 4/1987 | Hinman | 358/136 |
| 4,707,735 | 11/1987 | Busby | 358/108 |
| 4,743,971 | 5/1988 | Hügli | 358/213.26 |
| 4,747,155 | 5/1988 | Dotson | 382/42 |
| 4,764,781 | 8/1988 | Leib et al. | 354/65 |
| 4,796,090 | 1/1989 | Fraier | 358/211 |
| 4,803,710 | 2/1989 | Elabd | 377/60 |
| 4,814,629 | 3/1989 | Arnold | 250/578 |
| 4,908,705 | 3/1990 | Wight | 358/109 |
| 4,952,809 | 8/1990 | McEwen | 250/342 |

OTHER PUBLICATIONS

Augustyn, T., *The KS-146A LOROP Camera System*, pp. 1-10, (copy of this article reprinted at vol. 309, SPIE Proc. Paper 309-11, p. 76, Aug. 27-28, 1981.
Ruck, R., *The KA-93 Panoramic Camera*, vol. 79, SPIE Proc., pp. 208-215 (Mar. 24-25, 1976).
Ruck, R., *Design Versatility of the Prism Panoramic Camera: The KS-116 and KA-95 Cameras*, pp. 1-7 (copy of article reprinted at vol. 39, SPIE Proc. 309-310 p. 65, Aug. 27-28, 1981.
Ruck, R. et al., *KS-127A Long Range Oblique Reconnaissance Camera for RF-4 Aircraft*, (copy of article reprinted at vol. 242, SPIE Proc. 242-02, p. 22, Jul. 29-30, 1980).
Thompson-CFS Tubes Electroniques, *THX 31157 Area Array CCD Image Sensor*, Tech. Description, pp. 1-11, May 1988.
Janesick, J., *Multi-Pinned-Phase Charge-Coupled Device*, NASA Tech. Brief, vol. 14, No. 8, Item No. 115, pp. 1-13, Aug. 1990.
Sequin, C. et al., *Charge Transfer Devices*, pp. 154-54, 179, Bell Lab, Academic Press, 1975.
Howe, M. J. et al., *Charge-Coupled Devices and Systems*, pp. 252-254, J. Wiley and Sons, 1979.
Barbe, D. F., *Charge Coupled Devices*, vol. 38, Topics in Applied Physics, pp. 26-31, Springer-Verlag, 1980.
Fairchild Weston Systems, Inc., *1987 CCD Solid State Imaging Technology*, pp. 124-125, 1986.

Primary Examiner—James J. Groody
Assistant Examiner—Safet Metjahic
Attorney, Agent, or Firm—Allegretti & Witcoff, Ltd.

[57] ABSTRACT

An electro-optical area array reconnaissance detector is disclosed which accomplishes forward motion compensation electronically and without moving parts. The array is made of photo-sensitive cells arranged in rows and columns, the columns being organized into one or more column groups. Charge packets collected in the cells representing scene information are transferred down the columns at the same rate as the image motion in the plane of the array. In a side oblique reconnaissance scenario, the columns may be organized into 16 column groups, each column group having its own charge transfer rate corresponding to the image motion rate in that column group.

34 Claims, 10 Drawing Sheets

ELECTRO-OPTICAL IMAGING ARRAY WITH MOTION COMPENSATION

BACKGROUND OF THE INVENTION

1. Field of the Invention

This invention relates generally to motion compensation in imaging systems. More particularly, it relates to improved techniques which electronically compensate for the relative motion of an image of a scene with respect to an electro-optical imaging array suitable for carriage by a reconnaissance vehicle.

2. Background Art

Most people who have attempted to photograph a rapidly moving object at close range with a simple box camera have found that the film image of the object is blurred or smeared due to the relative motion of the image over the film. The same effect is observed if the camera is moved during exposure of a stationary scene. If light conditions permit very short exposure times, the image essentially can be "stopped" by increasing shutter speed, and the smearing can be minimized.

Reconnaissance cameras frequently are required to record images in light conditions that prevent sufficiently short exposure times to eliminate image smearing by increases in shutter speed alone. Typically, such cameras are carried by aircraft for recording terrain scenes. Imaging systems used in such cameras comprise not only film, but also electro-optical devices, including charge-coupled devices. In any such camera in which relative motion exists between a scene to be imaged and the imaging system, the recorded image of the scene will be smeared unless some technique is used to compensate for the relative motion. Such techniques commonly are known as "forward motion compensation" or "image motion compensation." Left uncompensated, the smearing and image degradation resulting from the relative motion reduces the information content of the recorded image.

When a scene of interest is directly below an aircraft, the rates of motion of all points of the scene image in the field of view are nearly the same, and the motion can be compensated to avoid smear relatively easily. For example, if the imaging system is film, smear is avoided by moving the film emulsion at the same rate and in the same direction as the motion of the scene image in the focal plane of the camera.

When the scene of interest is not directly below the aircraft, but is perpendicular to the direction of flight and at an oblique angle, the solution to the problem of image motion compensation becomes difficult, principally because objects at a closer distance to the aircraft appear to be moving faster relative to the aircraft than objects farther away. Similarly, when the scene of interest is forward of the aircraft, the solution to the problem of image motion compensation becomes more difficult because terrain farther ahead appears to be moving slower than terrain closer to the aircraft.

The specifics of the problem are modified when changes in the aircraft velocity, height above ground, or camera depression angle occur. These changes affect the rate of image motion in the focal plane of the camera, and they must be taken into account by a forward motion compensation system. The extent of image smear is most directly a function of the aircraft velocity relative to the ground (V), the height above ground (H), and the time period of exposure. The extent of the image smear is also a function of the magnitude of the field of view and the angle of depression below the horizontal where the field of view is located.

Mechanically-based forward motion compensation schemes have been devised and implemented in an attempt to eliminate image smear due to forward motion, or to reduce such smear to acceptable levels. Such schemes have been implemented by use of a translating film, a translating lens, or a rotating mirror.

In the translating film technique, the film is moved in the same direction and velocity as a portion of an image. The image motion velocity ($V_i$) and the film velocity ($V_f$) are made essentially synchronous and relative motion between them during the exposure time period essentially is eliminated. The net result is that the image portion is essentially stationary with respect to the film during the exposure time period. The translating film technique is frequently used on short and medium focal length framing type cameras.

In the translating lens technique, if a lens is translated in space, the image of distant objects will translate with the lens in a one-to-one relationship in the same direction. Therefore, if the lens in an aerial camera is translated at the proper velocity opposite to the direction of flight, the image velocity caused by the aircraft forward motion is cancelled by the image velocity due to the moving lens. The net result is that the image is essentially stationary relative to the film, and therefore no essential motion smearing is occurring during the exposure. This type of forward motion compensation is frequently used on short and medium focal length panoramic type scanning cameras. See, e.g., Ruck, *Design Versatility of the Prism Panoramic Camera: The KS-116 and KA-95 Cameras*, SPIE Proceedings, Vol. 309, paper 309-10, (Aug. 27-28, 1981).

In the rotating mirror technique, as the aircraft is flying in a given flight path, the objects in the scene have an apparent angular velocity relative to the camera. The apparent angular velocity is related to the aircraft velocity and the range to the target. If a camera is looking into a mirror at a nominal angle of 45°, the camera line of sight is deviated by a nominal 90° angle. If the mirror is rotated in the proper direction and at the proper rate during the exposure, the scene appears to have no motion relative to the camera. Therefore, at the film plane, the image is essentially stationary and forward motion image smear is substantially negated. The rotating mirror forward motion compensation concept is often used on long focal length frame and line scanning type cameras.

All three of the foregoing mechanical forward motion compensation schemes are employed in various aerial reconnaissance cameras, including film cameras and electro-optical line scanning cameras. A principal disadvantage of these forward motion compensation schemes is that they all involve mechanical devices and consequently add complexity, weight, and expense to the imaging system.

Other methods and techniques of forward motion compensation also have been developed. In the Prinz patent, U.S. Pat. No. 4,505,559, a mechanical image motion compensation technique is disclosed wherein a slot on a focal plane shutter moves in a direction transverse to the direction of film transport, while the direction of film transport is made parallel to the direction of flight. In order to compensate for a component of image motion, the slotted shutter is coupled to an encoder which, in the course of making an exposure, reports to a computer for instantaneous field position of the shutter slot. The computer determines the speed profile in the interval between successive exposures and issues a control signal to regulate the film drive.

The Gordon et al. patent, U.S. Pat. No. 4,157,218, discloses a wide angle scanning reconnaissance camera which uses a wide angle lens and a curved exposure slit disposed adjacent an image receiving surface, typically film. The exposure slit is crescent shaped to correspond to equal points of equal range so that there is negligible differential image motion within the slit, and the slit is of constant width in the direction of vehicle motion. The image receiving surface (e.g., film) is driven in the direction of vehicle movement at a speed corresponding to the altitude-velocity ratio of the vehicle with respect to the object field.

The Wight patent, U.S. Pat. No. 4,908,705, discloses an electro-optical aerial reconnaissance system wherein a linear charge-coupled device imager is movably positioned in the focal plane of a fixedly mounted wide angle lens system. The linear imager is moved in the fore and aft direction in the same direction as the apparent motion of the image to reduce the apparent image motion and consequent smear. This system, however, only is designed for imaging terrain at nadir, aft of nadir or ahead of nadir, and does not provide forward motion compensation in a side-oblique reconnaissance application.

For aerial reconnaissance, electro-optical cameras, particularly those of the charge-coupled device variety, are perceived as superior to film cameras to an increasing extent. In an electro-optical camera, radiation from an image of interest impinges on a solid state device typically having several thousand (at least) picture elements or pixels. The incident radiation is converted into charge packets (pixel information) at the photosites (pixels) and is collected in potential wells. The charge packets contain scene information, and upon being transferred out of the device, are converted into electrical signals. The primary advantage of an electro-optical imaging camera is that the scene information can be almost instantaneously "downloaded" from a reconnaissance aircraft to an earth-based station, or can be converted to a video image. Since charge-coupled device imaging cameras have very small pixels closely spaced together, the resolution of a resulting image tends to be very high. Electro-optical imaging cameras can be made sensitive to particular frequencies of incident radiation. Background information on charge-coupled devices can be found in standard texts such as D. Schroder, *Modular Series On Solid State Devices*, Ch. 3, 4, Addison-Wesley (1987), and in C. Sequin and M. Tompsett, *Charge Transfer Devices*, Bell Telephone Laboratories, Academic Press (1975), and in S. M. Sze, *Physics of Semiconductor Devices*, Ch. 7, John Wiley & Sons, Inc. (1981).

In a linear electro-optical focal plane reconnaissance detector, such as the linear detector of the Wight patent, a scene of interest is scanned a line at a time across an array in a direction perpendicular to the array length. Because the means of scanning is provided by the aircraft forward motion, the aircraft must maintain a steady, well defined flight path while the scene is being recorded. Depending on the size of the scene, the recording time for any one target may range between 10 and 20 seconds, or even longer. In a military situation in which the reconnaissance aircraft may be subject to enemy threats, the vulnerability during the recording time may be excessive.

To reduce the time needed to image a scene of interest and thus reduce the time of exposure to hostile threats, a preferred mode of the present invention uses a two-dimensional electro-optical imaging area array, rather than a linear (one-dimensional) array. An area array can image an entire scene instantaneously, rather than a line at a time. Until recently, only relatively small electro-optical imaging arrays have been commercially available, and are typically used in television cameras. But large, high pixel count area arrays suitable for aerial reconnaissance sensors are now entering the realm of feasibility. Two scientific imagers used in astronomical applications, the Tektronix TK 1024 CCD and the Ford Aerospace 4,096×4,096 pixel element array, can be adapted to the present invention by subdividing the arrays in column groups and providing the circuitry for faster frame rates. Information useful for designing high pixel count area arrays also is found in J. Janesick, *Multi-Pinned-Phase Charge-Coupled Device*, NASA Tech. Brief Vol. 14, No. 8, Item No. 115, p. 22, Jet Propulsion Laboratory, August, 1990.

An area type detector array can convert an entire image of a scene into a complete frame of pixel information during a short exposure period, typically on the order of a hundredth of a second. After the exposure period, a shutter can be used to prevent continued exposure while the pixel information in the array is read-out to a signal processing unit. After the read-out is completed, the array is ready for the next frame exposure. If the frame read-out time is short (much less than a second), then consecutive frames can be taken in sub-second intervals in order to obtain large scene coverage in short periods of time. By providing motion compensation in an area detector having exposure time controlled by a shutter, the present invention substantially reduces exposure of an aircraft, a pilot and a detector array to enemy countermeasures.

The motion compensation techniques of the present invention also enable effective use of a detector array having a large number of photosites or pixels (e.g., four to six thousand or more in both the columns and rows of the array) that will image a large area of terrain in every frame. The present invention makes such arrays practical by preserving image resolution (i.e., scene detail information) in every frame of imagery.

The present invention also enables high array exposure sensitivity. That is, motion compensation is accomplished in a way that promotes long exposure time without blurring the image. In a pushbroom system, exposure time is limited by the line rate which is dictated by the aircraft velocity to height ratio (V/H). For the present invention the exposure time is not limited by the aircraft V/H. This permits operation at lower scene illumination levels and extends the available time of day for light-sensitive sensor operation.

Additionally, the present invention provides for rapid read-out of collected scene information. A rapid read-out of the electrical signals of an array is necessary in order to achieve high frame rates. High frame rates are desirable to allow multiple images to be recorded in a short time such as required for stereo imagery.

The present invention offers additional advantages over linear electro-optical sensors. For example, motion compensation is provided irrespective of whether an electro-optical imaging array is deployed in a side oblique, forward oblique, or down-looking application.

The present invention also provides lower scene distortion and true stereo imagery capability. By using the present invention to replace a film camera mounted in an aircraft, motion compensation can be accomplished while retaining similar exposure times and aircraft maneuverability characteristics.

The present invention is reliable and robust because it requires no mechanical scanning mechanism, no rotating mirrors and no translating lenses in order to achieve forward motion compensation.

Another feature of the invention is that it is suitable for use in a wide variety of applications, such as tactical reconnaissance, drug interdiction, low intensity conflict, low and medium altitude missions, and reconnaissance at low light levels.

SUMMARY OF THE INVENTION

These and other objects, advantages, and features of the invention can be achieved by providing techniques for processing pixel information representing an image of a scene which compensate for image motion in a predetermined direction. An array of cells is used to store pixel information representing the image. The cells (photosites or pixels) are arranged in rows and columns and are suitable for carriage by a vehicle capable of motion in the predetermined direction. The columns are organized into one or more column groups, and pixel information (charge packets) located in the one or more groups is transferred at one or more predetermined transfer rates depending on the rate of motion of portions of the image relative to the array. The transfer rates preferably correspond to the rate of image motion in the focal plane of the array. One or more predetermined transfer rates can be adjusted depending on changes in the rate of motion of the vehicle and other parameters. In operation, the predetermined transfer rates for the pixel information in the column groups are adjusted to be as close as possible to the rates of image motion in the column groups. By using the foregoing techniques, resolution of the image created from the pixels is preserved, and image smear from the forward motion of the vehicle is substantially reduced.

One embodiment of the invention uses a shutter and lens system. The shutter opens during the time for exposure of the array, and the lens focuses the image of the scene onto the array. Pixel information is transferred by means of a master clock which issues signals at a master clock frequency, and by means of a plurality of drive and control circuits responsive to the signals from the master clock. Each of the drive and control circuits transfers pixel information in one of the column groups.

The drive and control circuits include a counter and a clock driver. The clock driver transfers pixel information in all the columns in a column group when the counter counts a predetermined number of counts. The number of counts for each column group is related to the predetermined transfer rate for each column group, which in turn is a function of various parameters that can include the velocity to height ratio and the focal length of the lens, as well as the distance from the array to the points of the scene to be imaged, and other factors to be discussed below.

According to one embodiment of the present invention, charge transfer from pixel to adjacent pixel occurs in the direction of image motion during the time of scene exposure. The rate of charge transfer in the column groups across the array varies from group to group so that charge transfer rate and the image motion velocity can be synchronized (in discrete steps) across the entire array when the array is deployed in a side oblique orientation. As a result, "graded" forward motion compensation can be embodied in an advanced electro-optical sensor with no moving parts.

In a forward oblique mode of operation, image motion in the focal plane of the array does not vary across the columns of the array. Nonetheless, image motion compensation in the forward oblique mode is similar to that of the side oblique mode. However, instead of varying the transfer rate of pixel information across the array from one column group to another, the transfer rates are the same across the columns of the array.

BRIEF DESCRIPTION OF THE DRAWINGS

The preferred embodiment of the present invention will be described in conjunction with the accompanying drawings, in which.

DESCRIPTION OF THE PREFERRED EMBODIMENT OF THE INVENTION

Figure 1:
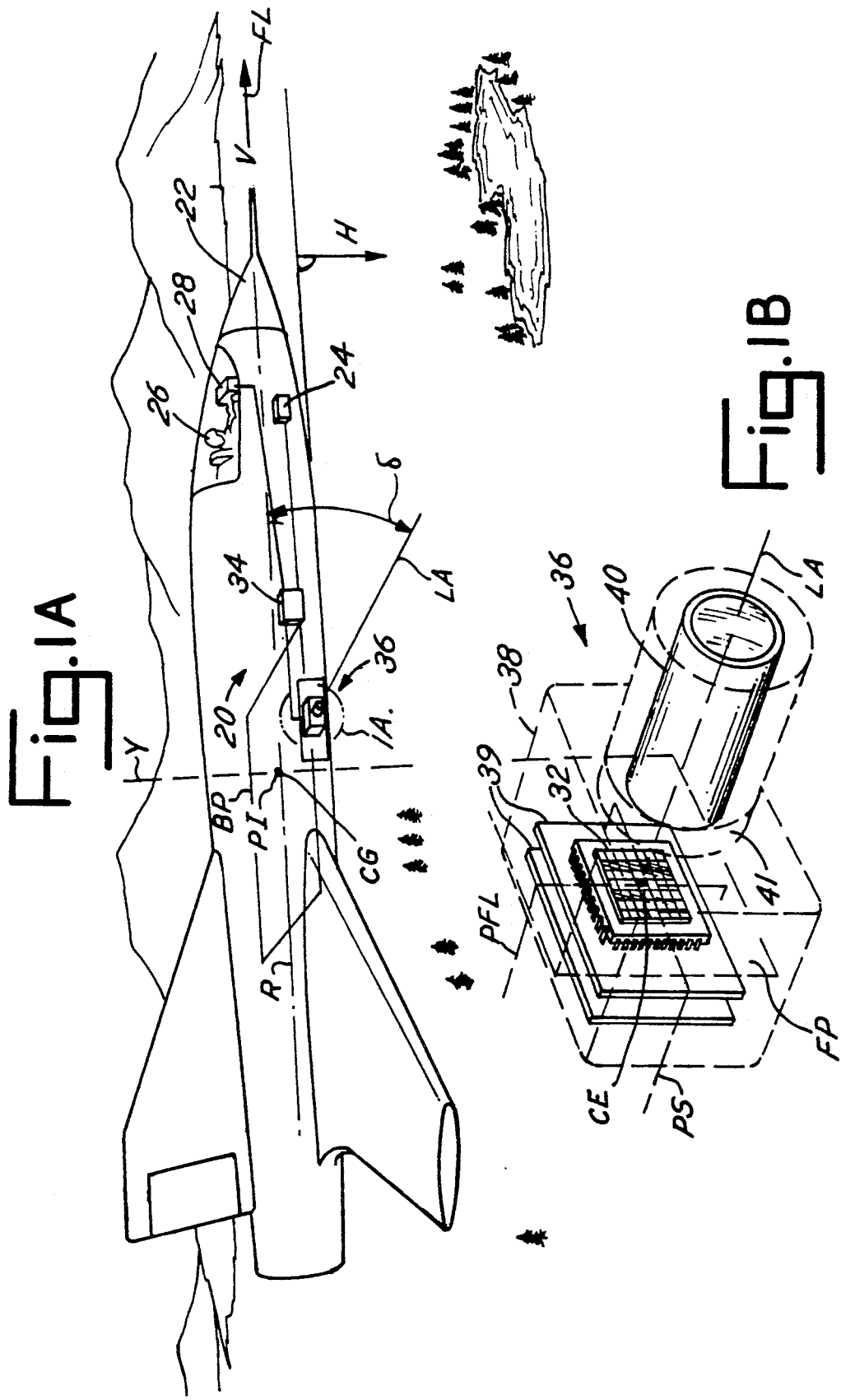
FIG. 1A is a simplified schematic drawing of an airborne reconnaissance system utilizing an electro-optical camera assembly made according to a preferred form of the present invention and showing the interrelationship between the system components.
FIG. 1B is an enlarged, fragmentary perspective drawing of the camera assembly of FIG. 1A showing the relationship between various components, including an electro-optical imaging array.

Referring to FIG. 1, a preferred form of electro-optical system according to the present invention comprises part of a reconnaissance system 20 installed in an aircraft 22 that defines orthogonal roll, pitch and yaw axes R, PI and Y, respectively, each passing through a center of gravity CG. The roll and pitch axes define a bilateral plane BP that is horizontal during level flight. System 20 includes a camera assembly 36 defining a lens axis LA that can be directed toward a scene of interest.

Aircraft 22 has an avionics system 24 which provides to system 20 input signals indicating aircraft ground velocity (V), aircraft height above ground (H), and aircraft roll, pitch and yaw angular position data. From console 28, an operator 26 provides additional inputs into system 20, such as the depression angle $\delta$ between axis LA and plane BP. The inputs from the avionics system 24 and console 28 are fed to a camera control computer 34 which processes the inputs, together with pre-flight programmed information, and generates control signals for camera assembly 36.

Referring to FIG. 1B, camera assembly 36 includes an imaging array 32 defining a focal plane FP having a center point CE. Camera assembly 36 also includes a housing 38 and a lens 40 having a focal length F (not shown in FIG. 1B) and defining axis LA that passes through point CE. A shutter 41 is provided to selectively expose array 32 to radiation from the scene. Typically, housing 38 is isolated from the aircraft 22 in order to reduce vibration or other high frequency, low-amplitude motions. Printed circuit cards 39 incorporate the electronics that support operation of array 32.

Figure 2:
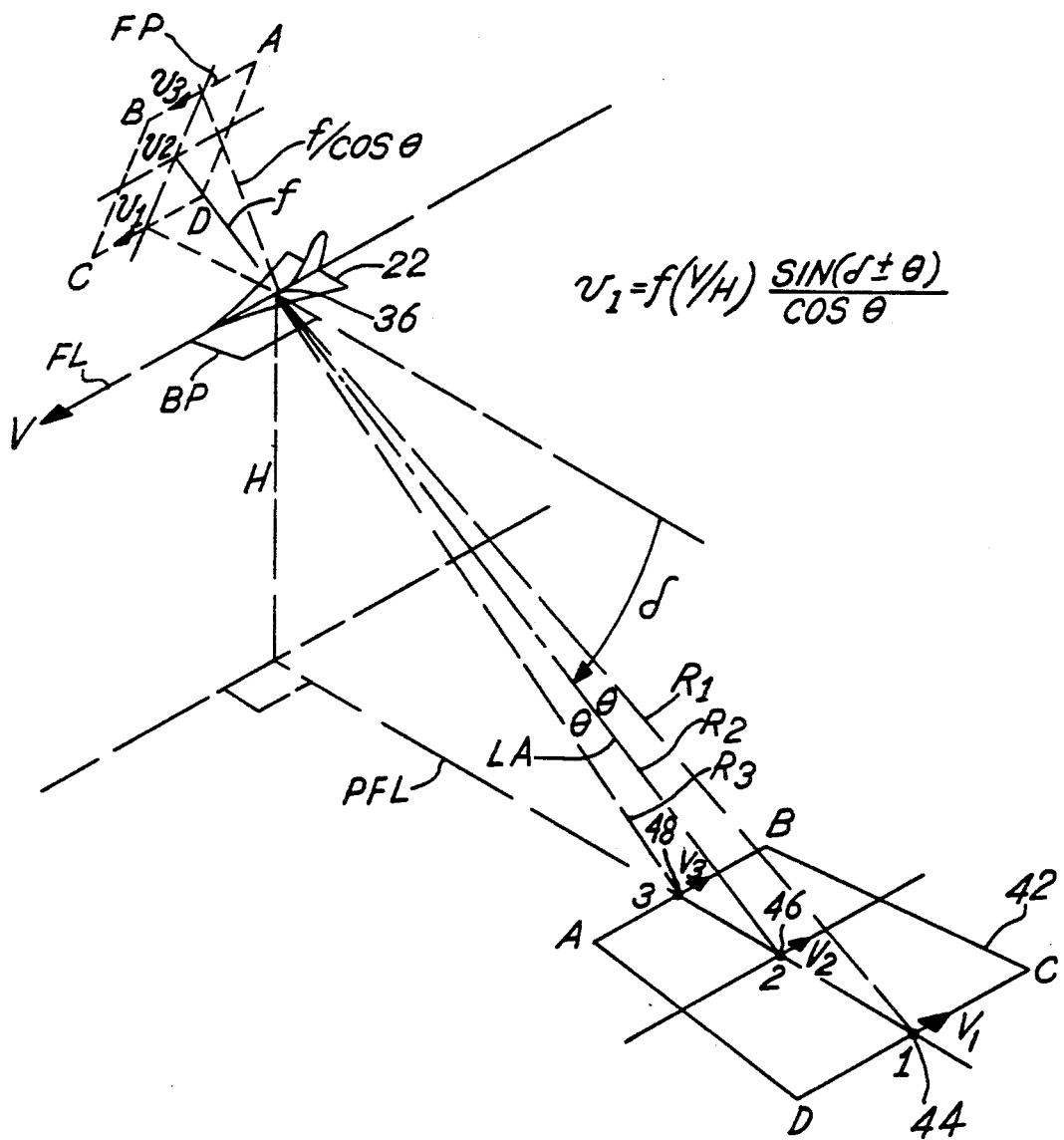
FIG. 2 is a schematic drawing of a reconnaissance aircraft operating in a side oblique mode and illustrating the focal plane of the camera assembly of FIG. 1B greatly enlarged and displaced in order to clearly show the relationship between the focal plane and a scene of interest.
Figure 3:
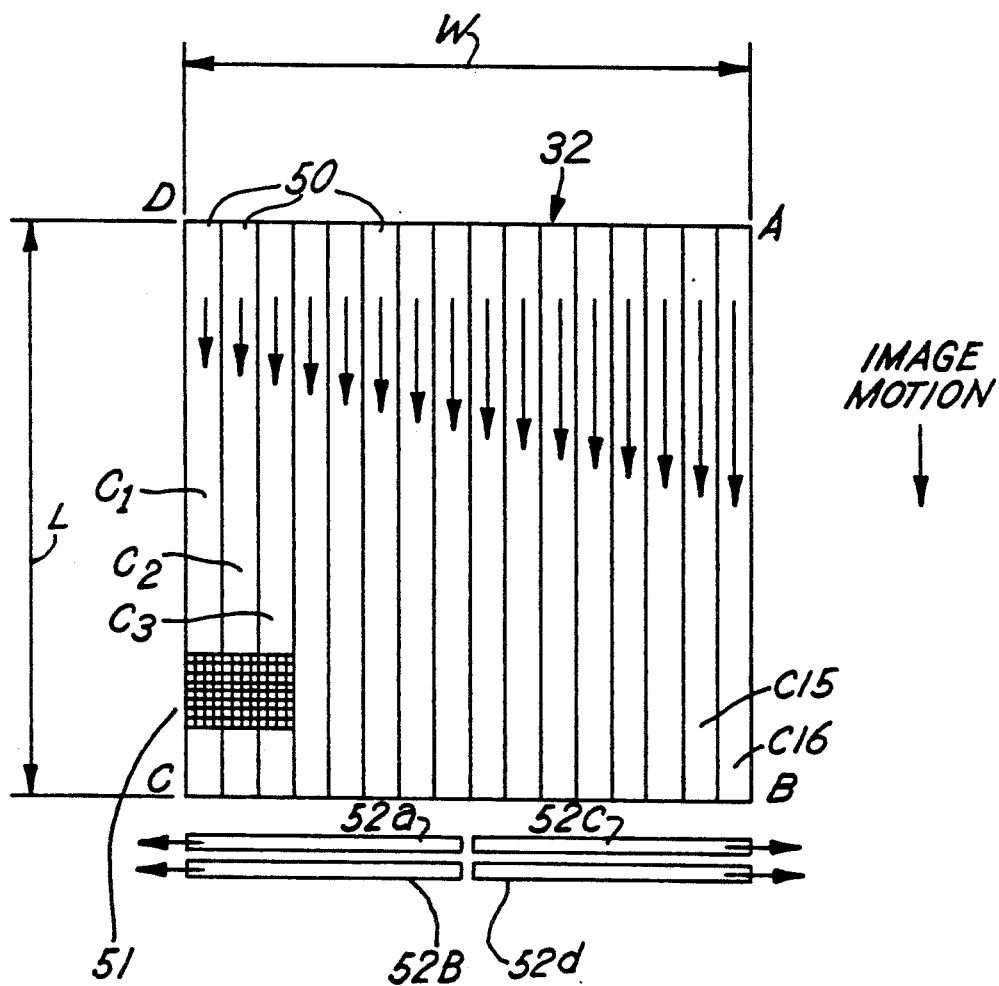
FIG. 3 is a schematic drawing of the imaging array of FIG. 1B showing the arrangement of the array in rows and columns, the organization of the columns into a plurality of column groups and the transfer of pixel information in each group at different predetermined transfer rates.

FIGS. 2 and 3 illustrate a preferred technique of "graded" forward motion compensation that is a principal feature of the present invention. FIG. 2 shows aircraft 22 carrying the camera assembly 36 operating in a side oblique mode, in which focal plane FP of imaging array 32 is oriented parallel to a line of flight vector FL coincident with roll axis R that defines the direction of motion of aircraft 22 and array 32. Referring to FIGS. 1B and 2, focal plane FP defines a plane PFL that is collinear with axis LA, passes through center point CE and is perpendicular to plane FP and vector FL. Focal plane FP also defines another plane PS that is collinear with axis LA, passes through center point CE and is perpendicular to planes FP and PFL and parallel to vector FL. Aircraft 22 flies over the terrain at velocity V and at height H. In order to image a scene 42, lens axis LA and plane PS of array 32 (FIG. 1B) are oriented at depression angle $\delta$ with respect to plane BP (FIG. 2).

Lens 40 focuses scene 42 onto imaging array 32, which is placed at the focal plane FP of the lens. The boundary of the scene is defined by points A-D, and the corresponding points in plane FP are shown with like letters. The rate of image motion is not constant throughout the array, but rather is dependent upon the range or distance R between lens 40 and the points of the scene lying in plane PFL. The greater the range, the slower the rate of image motion in focal plane FP of the lens. More specifically, the rate of image motion in the array at an arbitrary point, $V_i$, is equal to (F/cos $\Theta$)(V/$R_i$), where $\Theta$ is the field of view half angle, and $R_i$ is the range between the lens and the terrain point corresponding to the point $V_i$. Since focal length F normally is very small compared to range $R_i$, $R_i$ can be approximated by using the distance between the terrain point and the array or aircraft. As shown in FIG. 2, if point 44 on the terrain farthest from aircraft 22 is chosen (i.e., the midpoint of line segment CD), the image velocity v1 is equal to (F/cos $\Theta$)(V/$R_1$).

It can be shown that $R_i = H/\sin(\delta \pm \Theta)$, so $$V_i = F \frac{(V)}{(H)} \frac{\sin(\delta \pm \Theta)}{\cos \Theta}$$

Similarly, it follows that the image velocity in the array for point $V_2$ (corresponding to terrain point 46) is F(V/H)(sin $\delta$) and for point $V_3$ (corresponding to terrain point 48) is $$F(V/H) \frac{(\sin \delta + \Theta)}{\cos \Theta}.$$

To compensate for the fact that the image motion varies across the array, the preferred form of the present invention implements a "graded" forward motion compensation technique whereby array 32 is organized into a plurality of column groups, and charge is transferred from pixel to adjacent pixel in the direction of image motion during the time period of scene exposure. The rate of charge transfer is made variable in the direction transverse to the image motion, i.e., across the column groups of array 32. Thus, by synchronizing the charge transfer velocity and the image motion velocity in discrete steps across the array, graded forward motion compensation is achieved electronically with no moving parts. Ideally, each column of pixels would have its own column transfer rate. However, for many applications, it is sufficient to organize the array into a discrete number of column groups and to transfer charge at a uniform rate in all the columns of an individual column group.

Referring to FIG. 3, the boundary of the image of scene 42 on array 32 is indicated by points A-D which correspond to the like lettered points of scene 42 (FIG. 2). Width W of array 32 preferably is 48 to 60 mm and represents 4000 to 6000 pixels. Length L of array 32 preferably is 48 to 60 mm and represents 4000 to 6000 pixels. Only a few of the pixels 51 are shown schematically in FIG. 3. The pixels of array 32 are divided into rows and columns, and the columns, in turn, are organized into a plurality of column groups 50. The number of column groups selected may vary depending on the operational parameters of the system, the degree of resolution required, and the desired cost to performance ratio. It has been found that 16 column groups provide a very high level of forward motion compensation for array 32 and are an acceptable number of groups in an array having approximately 5,000 individual columns. Still referring to FIG. 3, each column group 50 has its own separate variable charge transfer rate (generally measured in pixels/second) depending on the image motion rate at the center of the column group. The variable charge transfer rates are represented as arrows, and the longer arrows represent faster rates. Referring to FIG. 3, and the example in FIG. 2, column C16, which images the terrain closet to line AB (FIG. 2), has the fastest charge transfer rate, since line AB is closest to aircraft 22, and the image motion appears fastest in that portion of scene 42. The charge transfer rates vary monotonically across the array. Column C1 which images terrain adjacent line CD (FIG. 2) has the slowest charge transfer rate.

During the exposure time period when shutter 41 is open, charge representing scene information is collected in pixels in array 32 and is transferred from one adjacent pixel to another according to the transfer rates in the column groups. When the exposure time period ends (i.e., when shutter 41 is closed), the accumulated charge representing the scene is sequentially read out of array 32 one row at a time into readout registers 52A-52D. From readout registers 52A-52D, the information is fed to signal processing equipment for evaluation by a user. When the readout is complete, array 32 is ready for the next scene exposure.

Figure 4:
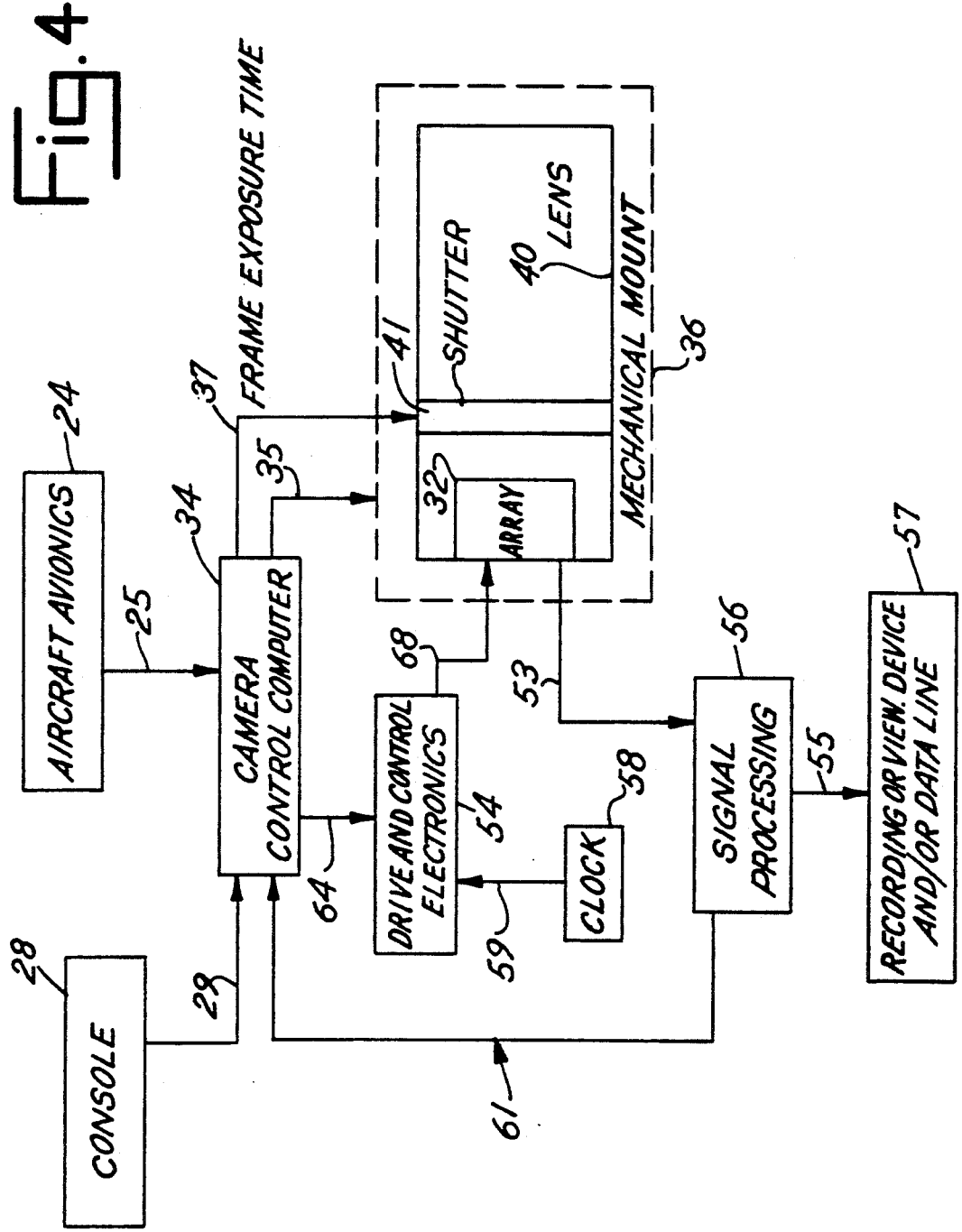
FIG. 4 is a block diagram of a preferred form of electronics and control circuitry that operates the electro-optical imaging array of FIG. 1B according to the teachings of the present invention.

Referring to FIG. 4, camera assembly 36 and its associated control circuitry are illustrated in block diagram form. Avionics system 24 provides velocity and height information over a bus 25 as inputs to camera control computer 34. From console 28, the operator inputs into computer 34 over a bus 29 the depression angle $\delta$ in degrees (FIG. 2). Stored in computer 34 are mission parameters that are previously determined, e.g., focal length F of lens 40, the mode of operation (side oblique or forward oblique), the size of array 32, number of column groups, pixel size, and a control circuit master clock frequency (discussed below).

After processing the data inputs, computer 34 transmits signals over a bus 35 that enable lens axis LA of camera 36 to be directed to the desired orientation, transmits signals over a bus 37 that controls the frame exposure time period by enabling opening and closing of shutter 41, and transmits command signals over a bus 64 to drive and control electronics 54. Drive and control electronics 54 transmits over a bus 68 signals that organize the columns of array 32 into one or more groups and that transfer pixel information located in the one or more groups at one or more predetermined transfer rates. Computer 34 functions as a means for adjusting the one or more predetermined transfer rates depending on the velocity of the aircraft, the height above the terrain, the depression angle and possibly other parameters. A master clock 58 issues pulses over a conductor 59 at a predetermined master clock frequency to drive and control electronics 54. Alternatively, the master clock pulses may be supplied by computer 34.

Scene information in imaging array 32 is fed over a bus 53 to a signal processing unit 56 which, in turn, sends the information over a bus 55 to a recording or viewing device 57, or to a data link for transmission to a remote location. Signal processing unit 56 also provides exposure control feedback to computer 34 over a bus 61 so that the frame exposure time may be adjusted to optimize signal collection.

Figure 5:
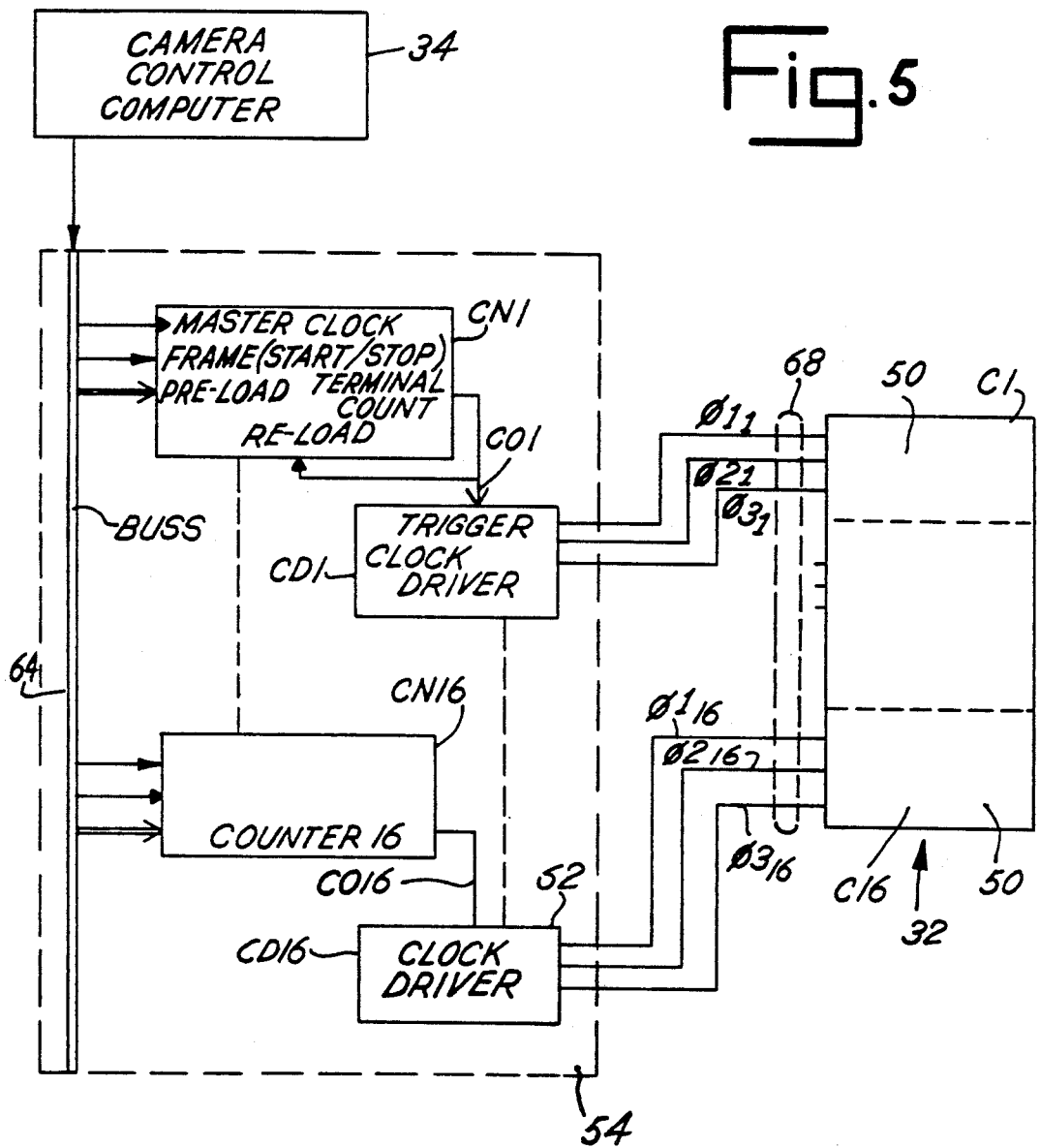
FIG. 5 is a block diagram of the drive and control circuitry shown in FIG. 4, illustrating the counter and clock drivers which transfer pixel information in each of the column groups of the imaging array shown in FIG. 3.

Referring to FIG. 5, drive and control electronics 54 is shown in greater detail and illustrates the alternative embodiment in which master clock pulses are provided by computer 34. For column groups C1-C16 of array 32, counters CN1-CN16 and corresponding clock drivers CD1-CD16 are provided. The outputs of counters CN1-CN16 are connected to the inputs of clock drivers CD1-CD16 by conductors CO1-CO16, respectively. Representative counter CN1 for column group C1 receives inputs over computer data bus 64, including pulses from a master clock located inside computer 34, a frame start/stop signal, and a pre-load signal representing a counter value which is related to the charge transfer rate for column group C1. When counter CN1 counts to the counter value, a trigger signal is sent by the counter to clock driver CD1 over conductor CO1. Clock driver CD1, in response to the trigger signal, transfers pixel information in all the columns in column group C1 by one row in array 32 by issuing voltage pulses over 3-phase output bus 68. This process of counting to a counter value and triggering a clock driver may repeat any number of times during the scene exposure depending on the rate of image motion in plane FP of array 32 (FIG. 1B). The faster the rate of image motion in the plane of the array, the more times the counting and triggering cycle must be repeated in order to synchronize the image motion with the array charge motion.

Still referring to FIG. 5, signals from camera control computer 34 travel via data bus 64 to each of the counters CN1-CN16 for each of column groups C1-C16. Each of clock drivers CD1-CD16 provides one set of 3-phase clocking output lines $\phi_1$, $\phi_2$ and $\phi_3$ per column group. In FIG. 5, the subscript of a clocking output line identifies the corresponding column group within column groups C1-C16.

Figure 6:
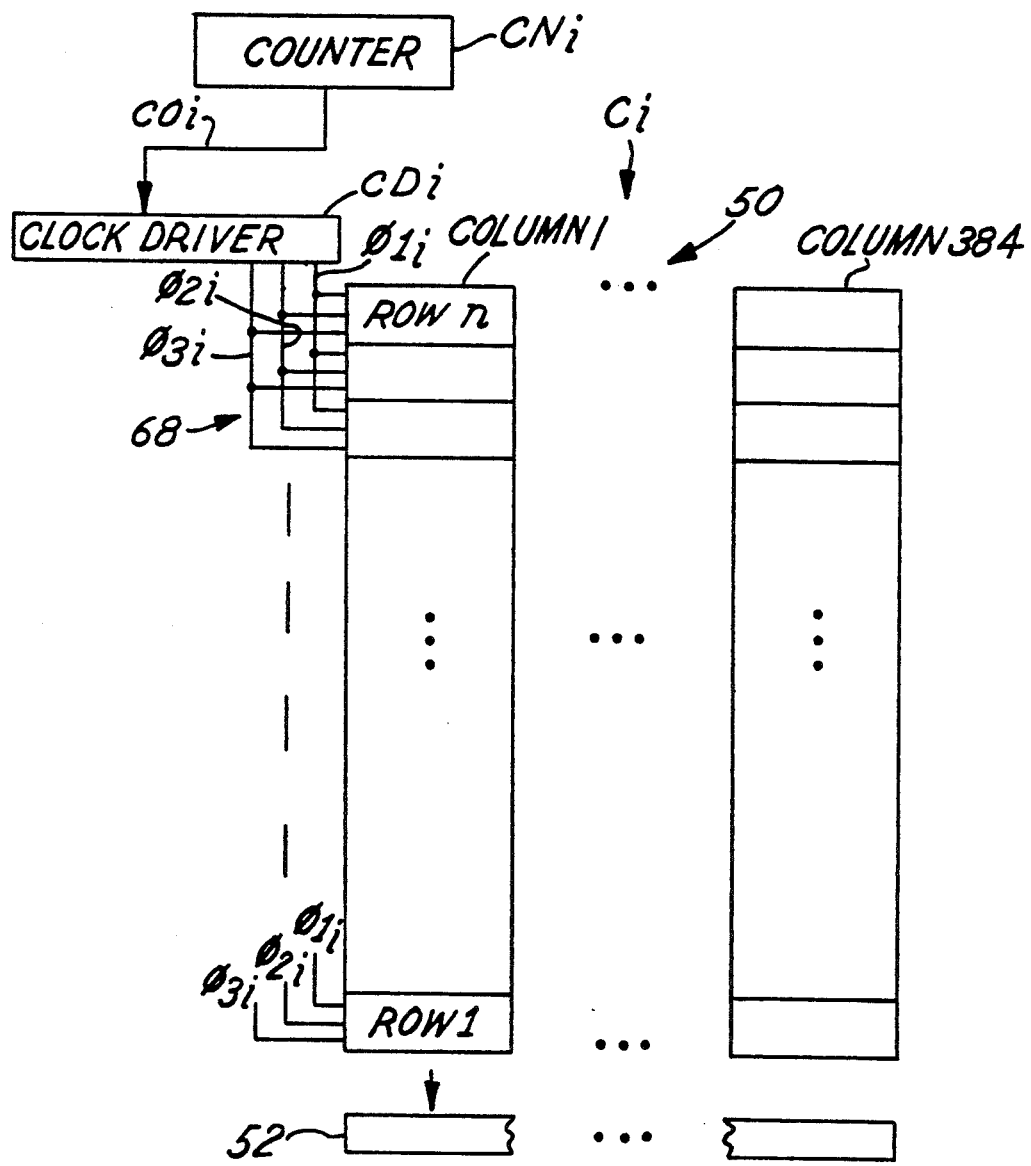
FIG. 6 is a schematic, block diagram of a counter and clock driver for an arbitrary column group of the imaging array of FIG. 3.

FIG. 6 shows isolated an arbitrary column group Ci (50) and its associated counter CNi and clock driver CDi. For purposes of illustration, column group Ci is composed of 384 individual columns. In order to ensure that all array rows in a column group are transferred simultaneously when a related counter triggers a corresponding clock driver, the 3-phase clocking must be provided to all rows of the column group. This is shown symbolically by the 3-phase output lines 68 of clock driver CNi extending the length of column group Ci so that each row of column group Ci receives the 3-phase clocking pulses.

Assuming the clock drive circuits are not fabricated on the imaging array, 3-phase output bus lines 68 must be bonded to separate package pins for external drive control. Thus, the number of vertical clock drive pins for array 32 is three times the number of column groups.

Figure 7:
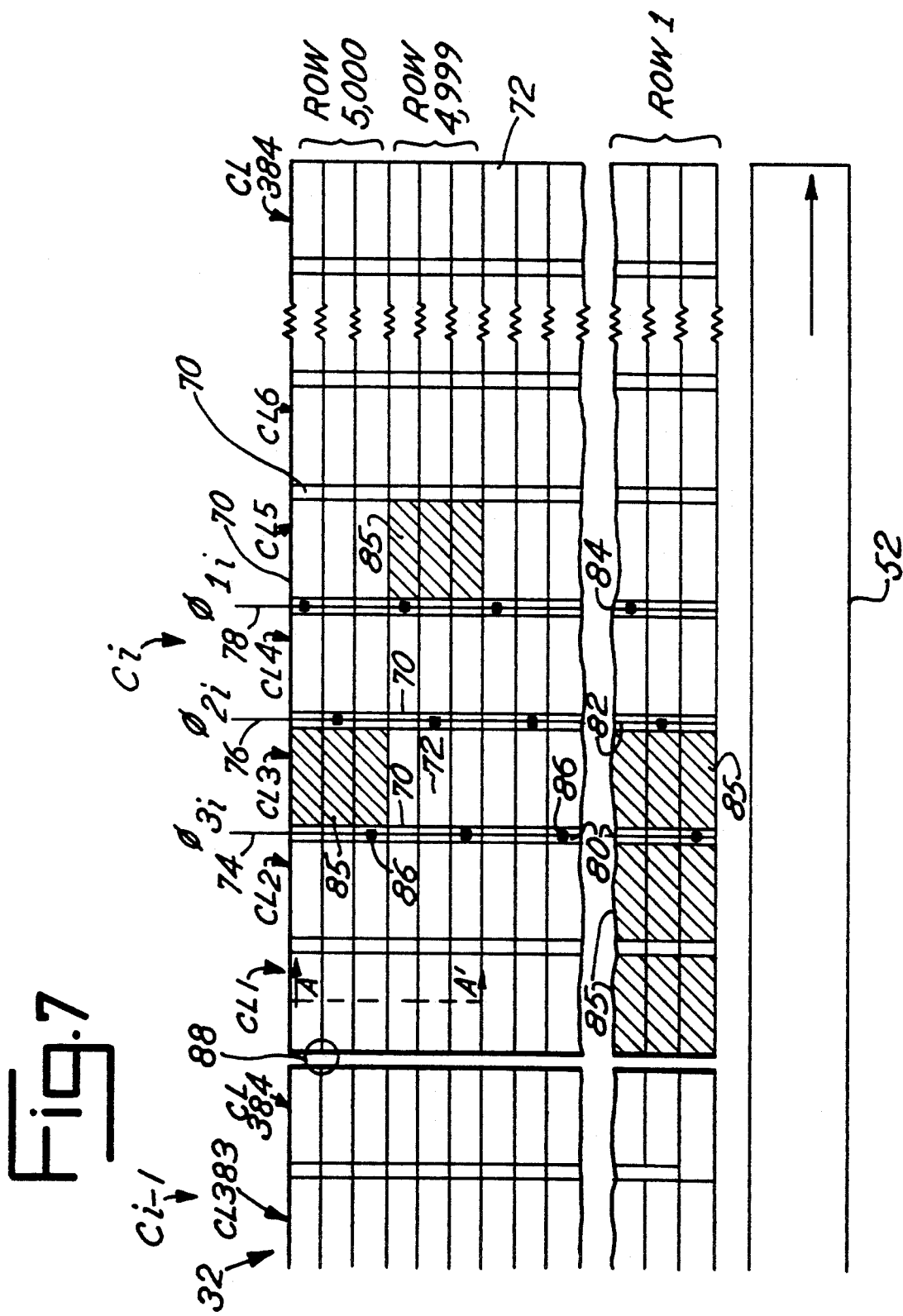
FIG. 7 is a schematic drawing of one section of an arbitrary column group showing the metalization on top of the channel stop region between photosites of the array to provide the three-phase drive clocking to the column group.

FIG. 7 shows in enlarged detail one portion of an arbitrary column group Ci of imaging array 32. In particular, part of column group Ci is shown adjacent part of a neighboring column group Ci-1. Column group Ci is composed of 5,000 rows of photosites 85 and 384 columns designated CL1-CL384. Each photosite (shaded region) is bounded by a p+ channel stop 70, which separates each column from the next. Polysilicon horizontal lines 72 subdivide the photosite and bus the 3-phase clocking signals across the column group. The vertical clock drive pins 74, 76 and 78 are connected to metallization lines 80, 82 and 84, which run the entire length of the column group.

Metal to polysilicon contacts 86 on top of the channel stop regions 70 are provided periodically every third horizontal line throughout the length of the column group for each metallization line to provide the voltage pulses for each row of the array. The 3-phase clocking signals (voltage pulses) may confine individual photosite charges vertically or may provide for the vertical transfer of these charge packets. Column groups Ci and Ci-1 are separated from each other by providing a break 88 in the polysilicon horizontal lines 72.

Figure 8:
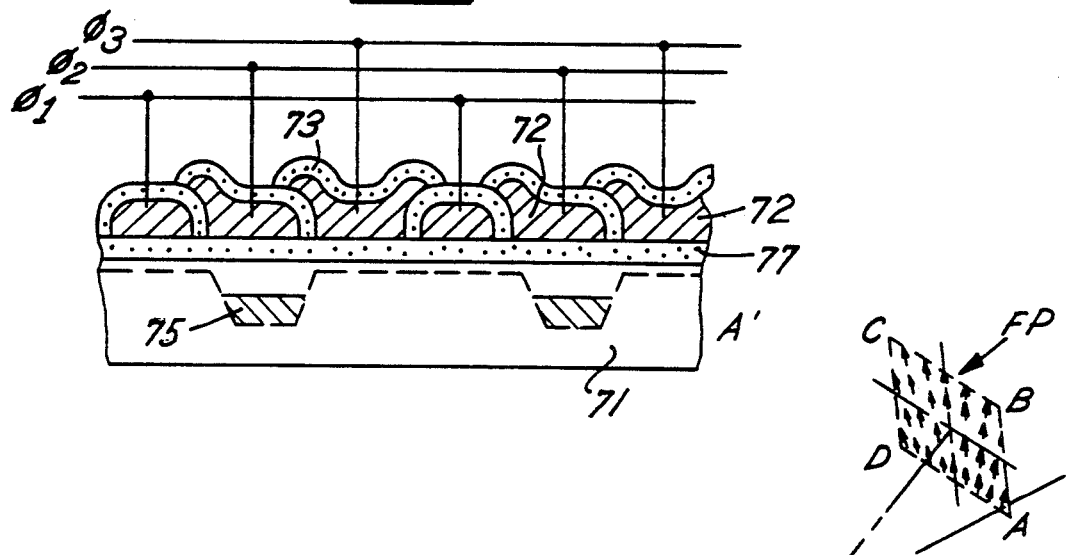
FIG. 8 is a cross-sectional view of one section of the column group of FIG. 7.

FIG. 8 is a simplified cross-sectional view of the array of FIG. 7 along the line AA'. The polysilicon horizontal lines 72 are pulsed by the 3-phase clocks $\phi_1$, $\phi_2$, $\phi_3$, causing charge packets collected in potential wells 75 in a p-type silicon substrate 71 to be shifted down the array. In FIG. 8, the polysilicon horizontal lines 72 are isolated from each other by a SiO$_2$ layer 73. Another SiO$_2$ layer 77 also separates the polysilicon horizontal lines 72 from substrate 71.

The charge-coupled device architecture shown in FIG. 7 is essentially a full frame imager configuration. The full frame configuration provides a large area array which provides a high percentage of silicon wafer area available for light collection. By contrast, a frame transfer architecture requires a frame storage region which occupies approximately the same amount of silicon wafer area as the imaging area. The interline transfer architecture is not as desirable since it does not provide the image resolution and small pixel pitch of the full frame design. The interline transfer architecture also requires a vertical transport register which adds non-sensitive spacing between adjacent pixels, reducing fill-factor and resolution. An X-Y addressable charge injection device is another possible architecture for the present invention, but it, too, is considered not as desirable. A discrete array of diode detector elements is also a possible architecture for the invention. Such an array or the above-mentioned architectures could operate in the ultraviolet, visible, or infrared spectral regions. Nevertheless, the teachings disclosed herein can be readily adapted to these architectures should they be preferred for other reasons, and the scope of the present invention is intended to cover these alternative architectures.

SYSTEM OPERATION

Referring to FIGS. 1A-5, the operation of the imaging array in a side oblique mode to provide graded forward motion compensation will be first discussed. Premission programmed information is supplied to camera control computer 34, and includes:

F = focal length of lens 40;
m = imaging array width perpendicular to the charge transfer direction (i.e., width W, FIG. 3);
N = number of array column groups;
P$_x$ = pixel size, in the charge transfer direction (i.e., direction of the vertical arrows in FIG. 3);
X = master clock frequency;
FOV = field of view = 2 arctan (m/2F)
$\Theta_1 = \Theta_n = $ (FOV/2) (N−1/N)

When the operator is ready to begin taking pictures, he or she selects a depression angle δ (FIG. 2) to image the terrain scene of interest. At this time, avionics system 24 provides to computer 34 the velocity and height data.

From these parameters, computer 34 calculates the charge transfer rate for the first column group (f$_1$) and the charge transfer rate for the Nth column group (f$_n$) according to:

$$f_1 = \frac{(F)}{(P_x)} \frac{(V)}{(H)} \frac{(\sin(\delta \pm \Theta_1))}{\cos \Theta_1} \quad (1)$$

$$f_n = \frac{(F)}{(P_x)} \frac{(V)}{(H)} \frac{(\sin(\delta \pm \Theta_n))}{\cos \Theta_n}$$

The "+" and "−" above will be opposite for f$_1$ and for f$_n$, and the choice of sign depends on the array orientation. The above equations hold for depression angles from 0° to 180°, where 0° to 90° would be arbitrarily defined as left oblique and 90° to 180° would be right oblique.

To determine the charge transfer rates for the column groups between 1 and N, a sinusoidal formula $$f_i = \frac{(F)}{(P_x)} \frac{(V)}{(H)} \frac{(\sin(\delta \pm \Theta_i))}{\cos \Theta}$$

could be used, with the values of Θ calculated to the center of each column group. However, in the preferred embodiment, a linear approximation formula is used which yields substantially the same results, with an error factor of about 0.01%. This linear approximation formula for the charge transfer rates for the i$^{th}$ column group is:

(2) $f_i = f_1 + (i-1)(f_n - f_1)/(N-1)$.

After calculating the charge transfer rates for each column group, the computer then calculates the pre-load counter value for each counter CN in drive and control electronics 54 (FIG. 5). These counter values CV$_i$ for each counter (and for each column group) are:

$$CV_i = \frac{X}{f_i}$$

where X is the master clock frequency and f$_i$ is the charge transfer rate in the i$^{th}$ column group. The counters are then pre-loaded with the counter values over bus 64 (FIG. 5).

When the operator triggers a frame to take a picture, the shutter is simultaneously opened for an exposure time period calculated by computer 34. In this example, the exposure time period is 0.01 second. At the same time, each counter in drive and control electronics 54 begins counting at the frequency X to its pre-loaded counter value. The counting may be up to the counter value or down to 0 from the counter value. When the counter counts the predetermined number of counts, a trigger signal is sent from the counter to the clock drive CD for that counter, and one cycle of 3-phase clocking as triggered in the corresponding column group. Pixel information (electric charge packets) containing scene information is thereby shifted down one row vertically in all the columns in that column group.

After issuing a trigger pulse to the clock driver, the counter then automatically reloads and begins counting to the counter value again. When the counter value is reached again, the trigger pulse is sent, the clock driver shifts the pixel information one row vertically in all the columns in the column group, the counter reloads and the cycle is performed again. Meanwhile, the cycles are also being performed in the other column groups. Because each column group has a different charge transfer rate and corresponding counter value in order to match the charge transfer rate to the image motion rate, a principal object of the invention (i.e., electronic forward motion compensation without moving parts) is realized.

Although in the preferred embodiment the imaging array is divided into 16 column groups as a tradeoff between performance and cost, it may be desirable to use a 32 or higher column group regime. The more column groups there are, the less error (image smear) there is at the boundaries between adjacent column groups. However, with 32 column groups, there must be twice as many counters and clock drivers, as well as control lines, in the array. With fewer column groups, e.g., 8, the control circuitry is reduced proportionately, thus lowering cost, but image smear near the edges of the column groups may be unacceptable. The size of the array may be another factor when deciding how many column groups to use.

Referring to FIG. 2, as an example of system operation, let V=480 knots, H=3000 ft., F=76.2 mm, N=16, δ=30° side oblique, and Θ=22° (field of view=44°). The integration time (exposure time period), which depends on the light level, is chosen to be 0.01 seconds. The pixel size is 0.01 mm.

First, the computer calculates $f_1$ and $f_{16}$ according to equations (1). Then, from equations (2), the linear approximation formula is used to calculate the charge transfer rates for the remaining column groups. The charge transfer rates, $f_i$, are in units of pixels/integration time, or, in other words, rows of charge transfer per exposure time period. The results can be tabulated:

| Column Group i | Charge Transfer Rate $f_i$ |
|---|---|
| C1 | 3.554 pixels/integration time (rows per exposure time period) |
| C2 | 4.452 |
| C3 | 5.349 |
| C4 | 6.247 |
| C5 | 7.145 |
| C6 | 8.043 |
| C7 | 8.940 |
| C8 | 9.838 |
| C9 | 10.736 |
| C10 | 11.634 |
| C11 | 12.531 |
| C12 | 13.429 |
| C13 | 14.327 |
| C14 | 15.225 |
| C15 | 16.122 |
| C16 | 17.020 |

Using column group 9 for illustration, during the exposure time period, the image moves 10.736 pixels down each of the columns in column group C9. Therefore, during the exposure time period, the charge packets in column group C9 representing scene information must be shifted vertically down the columns of the column group by 10.736 pixels. More precisely, the charge packets must be moved by one pixel in the vertical direction every 0.01/10.736 seconds.

To do this, counter CN9 for column group C9 is loaded with its particular counter value. If the master clock frequency is 10 MHz, or 100 ns/count, then the integration time of 0.01 seconds results in 100,000 master clock counts in the exposure time period. Thus, the counter value for column group C9 is 100,000/10.736, or 9,314. At the moment of opening the shutter, the counter, having been set to zero, begins to count at the master clock frequency up to 9,314. At count number 9,314 a match is obtained, and the clock driver CD9 (FIG. 5) is triggered. The charge packets in all the columns of column group C9 then are shifted by one row vertically. Counter CN9 is reset to zero and begins counting up to 9,314 again. Ten cycles of counting and triggering are obtained in 93,140 counts, and during the remainder of the integration time, no more clock cycles are triggered.

In the present example, note that if the exposure time period is reduced to 0.005 second, the image motion becomes 10.736/2 or 5.368 pixels during the integration time, and the total of master clock counts during exposure is halved as well to 50,000. However, the counter value remains the same. Thus, the exposure period is not critical to the implementation of the invention, and can be varied by the operator without affecting the forward motion compensation. The counter values $CV_i$ can be calculated in units of clock cycles per line as $X/f_i$ where X is in units of cycles per second and $f_i$ is in units of lines per second. The $f_i$ are derived as in equations (1) and (2), as before.

FORWARD OBLIQUE OPERATION

Figure 9:
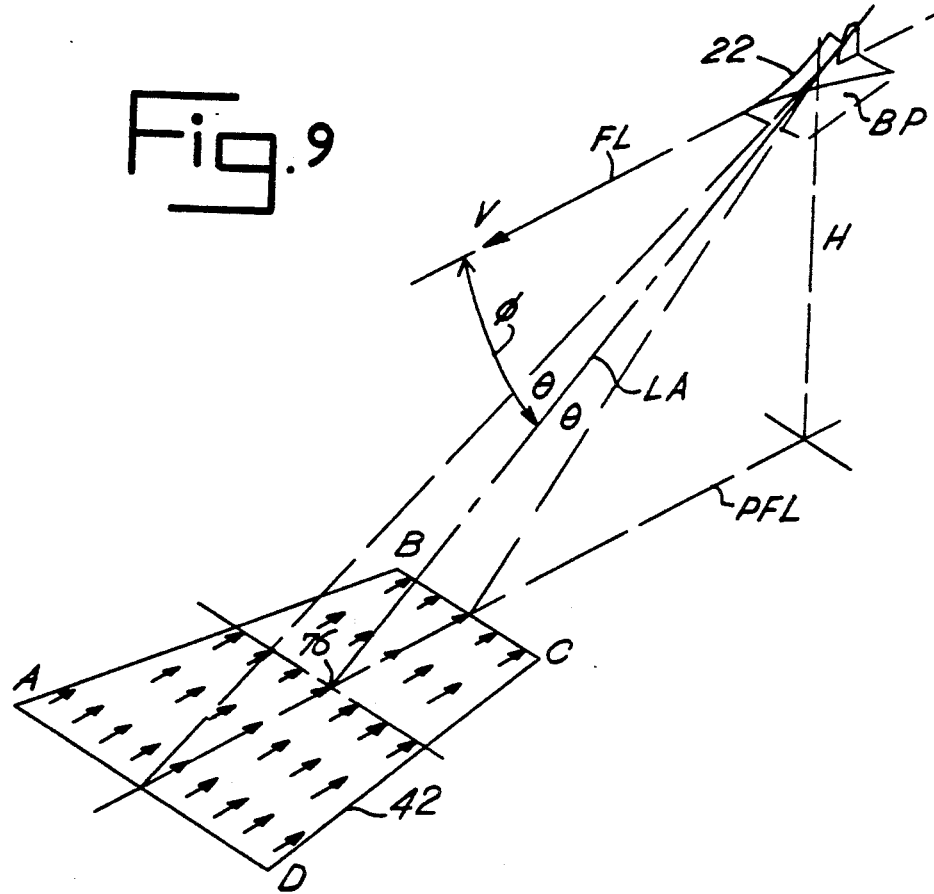
FIG. 9 is a schematic drawing of a reconnaissance aircraft operating in a forward oblique mode and illustrating the focal plane of the camera assembly of FIG. 1B greatly enlarged and displaced in order to clearly show the relationship between the focal plane and a scene of interest.

The imaging array of the present invention is suitable for providing forward motion compensation in a forward oblique framing mode. Referring to FIG. 9, the terrain of interest 42 is located directly forward of aircraft 22. The depression angle φ represents the angle between plane BP and lens axis LA that intersects the center of the terrain of interest 42.

In the forward oblique mode, the image velocity across array 32 (i.e., transverse to the direction of flight) is approximately constant for narrow fields of view. However, the image velocity at the top of the array is different from that at the bottom of the array. To maximize image resolution, the image velocity near the center of the array is chosen, and the charge transfer rate down the columns of the array is selected to be synchronized at this rate. This provides a selection which is correct at one point and a "best fit" compromise for other points in the array. Of course, other points could be chosen and the charge transfer rate selected to be synchronized at those points. The image velocity ($V_i$), and thus the charge transfer rate, is given by:

$$V_i = F \frac{(V)}{(H)} \sin^2 (\phi \pm \Theta_i)$$

where F is the focal length of lens 40 and ($\phi \pm \Theta_i$) is the forward depression angle of the point chosen for synchronization for forward motion correction.

The charge transfer rate in all the column groups is the same in the forward oblique mode. Thus, array 32 is organized into one column group. Computer 34 calculates the charge transfer rate, f, which is given by:

$$f = \frac{(F)}{P_x} \frac{(V)}{H} \sin^2 (\phi \pm \Theta_i)$$

The counter values for all the counters are the same, and are given by $$\frac{X}{f}$$

where X is the master clock frequency. After the counter values are loaded into the counters (FIG. 5) and shutter 41 opens, counters CN begin counting, and clock drivers CD are triggered. When a match is obtained, the counters reload, and the cycles are repeated as in the side oblique mode.

In the forward oblique mode, only one counter and one clock driver are necessary provided that the clock driver triggers all the columns in the array. A prior art electro-optical area array that does not have the column groups disclosed in this specification is readily adaptable to the foregoing forward oblique motion compensation technique.

Figure 10:
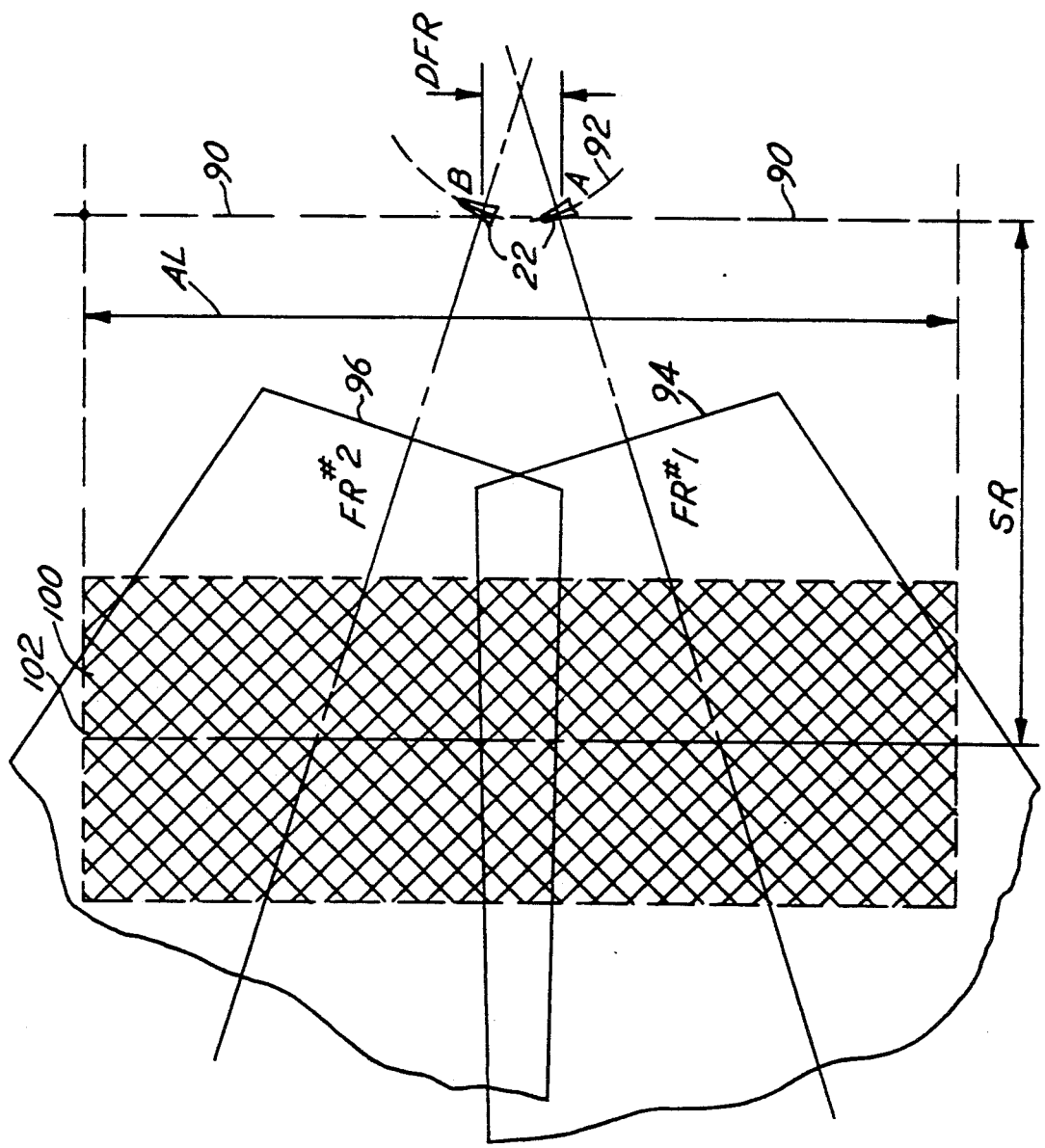
FIG. 10 is a schematic diagram of a side oblique reconnaissance application of the present invention, showing the time advantage of the electro-optical camera assembly of FIG. 1B as compared to a prior art linear assembly.

A practical advantage of the present invention can be seen in the illustration of FIG. 10 which represents a hypothetical reconnaissance scenario in which aircraft 22 is assigned to record the image of an airstrip 100 under hostile control having a length AL of 11,000 feet, a width of about 4,000 feet and defining a centerline 102. In order to properly record the airstrip, aircraft 22 is scheduled to fly at an altitude of 4,000 feet, at a velocity of 810 feet/second, and at a standoff range SR of 6,500 feet from centerline 102. At standoff range SR, the slant range from aircraft 22 to centerline 102 is 7,632 feet. The lens used in aircraft 22 has a focal length of 60 mm and is oriented at a depression angle $\delta$ of 31.6°. The field of view is 43.6° and $\Theta$ therefore is 21.8°. Array 32 is 48 mm along each side.

For a prior art linear charge-coupled device with "push broom" operation to image airstrip 100, it would have to fly the entire length of the zone of interest at the standoff range of 6,500 feet along a flight path 90. The aircraft would be exposed to hostile fire for 13.6 seconds (i.e., 11,000 feet/810 feet per second) and during that time would have to fly steadily along flight path 90.

In contrast, an aircraft 22 travelling at the same speed, but using the imaging array of the present invention, could sweep in along a path 92 and take two frame pictures 94 and 96 at points A and B, respectively, to cover airstrip 100. When picture 94 is taken at location A, aircraft 22 is operating in a side oblique mode at standoff range SR, but oriented at a small angle with respect to the center axis of the airstrip. Picture 96 can be taken at location B, while aircraft 22 is coming out of arc 92. Aircraft 22 travels only distance DFR of about 1,000 feet along path 92 between points A and B. As a result, exposure to hostile threats is reduced to only 1.23 seconds (i.e., 1,000 feet/810 feet per second). Thus, by using the present invention, the exposure of reconnaissance aircraft 22 to enemy threats during imaging is reduced by a factor of greater than 10.

Figure 11:
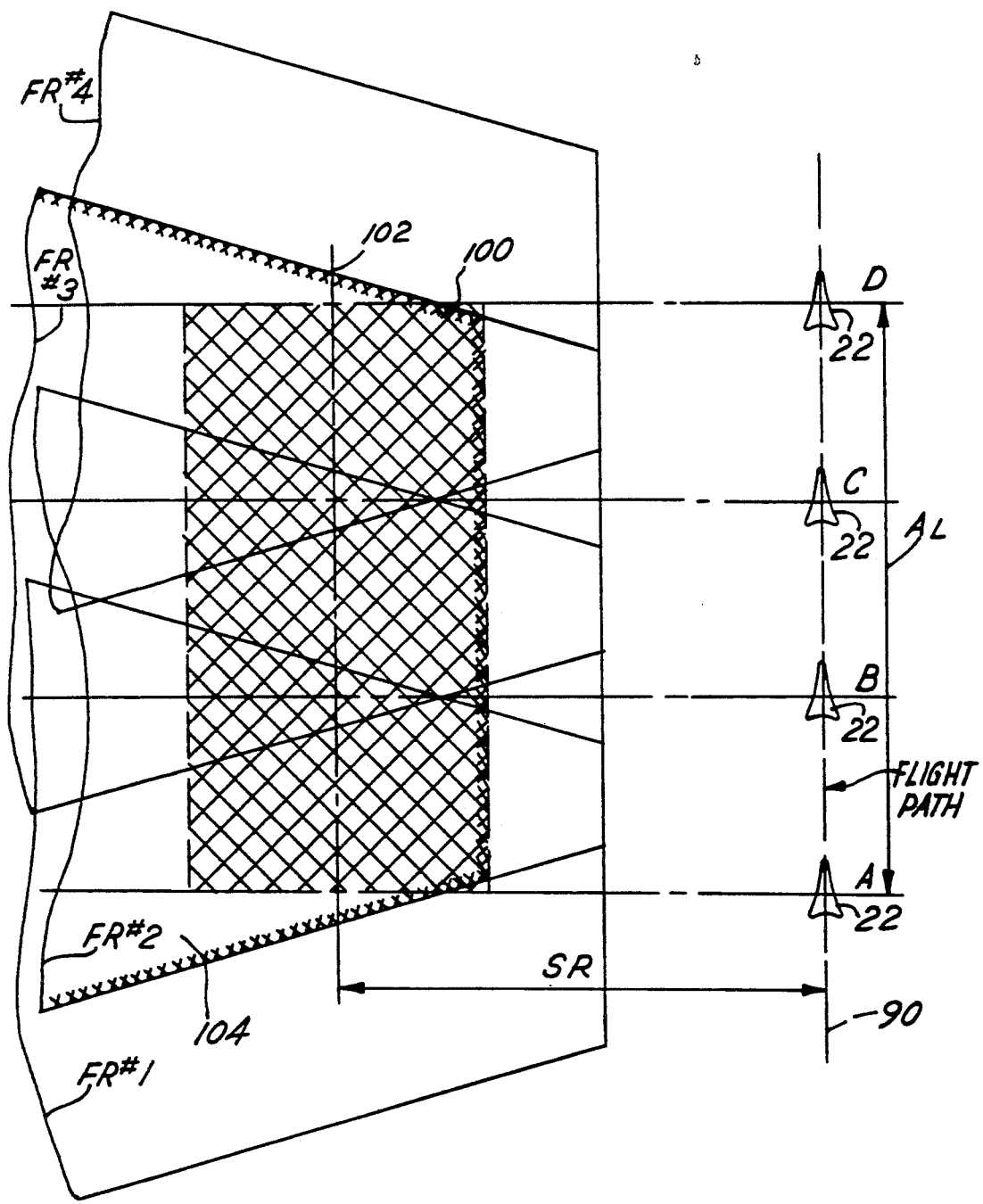
FIG. 11 is a schematic diagram of a side oblique reconnaissance application of the present invention illustrating how stereo scene coverage can be obtained using the electro-optical camera assembly of FIG. 1B.

FIG. 11 illustrates how the imaging array of the present invention can be used to generate stereo scene coverage of a terrain of interest. The same conditions and parameters described with respect to FIG. 10 also apply to FIG. 11, except that airstrip length AL is 8,000 feet instead of 11,000 feet. Aircraft 22 flies parallel to airstrip 100 along flight path 90 and takes four frames FR1-FR4 at locations A, B, C, and D, respectively. Because the overlapping frames yield two views of terrain of interest, stereo scene coverage is obtained in region 104.

The foregoing description of the preferred embodiment has assumed that the imaging array is a single, monolithic detector. It is possible to make a detector that is equivalent to the imaging array disclosed herein by piecing together in mosaic fashion smaller individual area arrays to make one large array. The individual arrays (perhaps 4, 20 or even 100) are electronically combined and include a means for organizing the columns in all the individual arrays into one or more column groups and a means for transferring pixel information located in the one or more column groups at one or more predetermined transfer rates. One such array that could be used as an element of the "mosaic" is the Thomson CSF THX 31157 charge-coupled device. In the mosaic, each charge-coupled device could be separately controlled as an individual column group. In the appended claims, the term "array" is accordingly intended to include either a single, monolithic array or an array composed of individual arrays electronically, optically or physically combined together, or individual discrete detectors mounted in a hybrid mosaic array.

While the foregoing description of the preferred embodiment has set forth an exemplary method and apparatus for achieving motion compensation in an electro-optical imaging array, those of ordinary skill in the art will appreciate that many alternatives can be used without departing from the spirit and scope of the invention as defined in the appended claims. For example, digital electronic control circuits other than those disclosed can be used to control the charge transfer rates in the column groups of an imaging array. Moreover, analog circuits, delay circuits, or other types of control circuits may be devised to control the charge transfer rates to achieve forward motion compensation. In addition, many of the functions performed by the disclosed digital electronic control circuits can be implemented in software by computer 34 or another data processor. As previously noted, alternative architectures for an electro-optical imaging array may be chosen. The present invention, as defined in the appended claims, is intended to cover all such modifications and alternative implementations.

What is claimed is:

1. Apparatus for processing pixel information representing an image of a scene comprising at least a first image portion and a second image portion occurring simultaneously, said apparatus compensating for image motion in a predetermined direction and comprising:
   an array of cells arranged in rows and columns capable of storing at least said pixel information corresponding to said first image portion in a first column of said columns and for storing said pixel information corresponding to said second image portion in a second column of said columns; and
   column transfer means for transferring pixel information corresponding to said first image portion in said first column at a first predetermined transfer rate and for transferring pixel information corresponding to said second image portion in said second column at a second predetermined transfer rate different from said first predetermined transfer rate, whereby resolution of an image created from the pixels can be preserved.

2. Apparatus, as claimed in claim 1, and further comprising:
   adjusting means for adjusting said predetermined transfer rate depending on the changes in rates of motion of said at least first and second image portions relative to said array.

3. Apparatus, as claimed in claim 2, and further comprising imaging means for placeng said image on said array.

4. Apparatus, as claimed in claim 3, and further comprising a shutter for enabling said imaging means to place said image on said array during a predetermined exposure time period, and wherein said column transfer means is operative during said predetermined exposure time period.

5. Apparatus, as claimed in claim 1, wherein said array comprises a charge-coupled device.

6. Apparatus, as claimed in claim 2, wherein said column transfer means comprises:
   means for organizing said columns of said array into at least a first column group storing pixel information corresponding to said first image portion and a second column group storing pixel information corresponding to said second image portion; and
   two or more transfer control circuits, each of said transfer control circuits transferring pixel information in one of said at least first and second column groups.

7. Apparatus, as claimed in claim 1, wherein said column transfer means organizes the columns of said array into a plurality of column groups including a first column group and a second column group and wherein said first predetermined transfer rate is proportional to a first rate of image motion relative to the said first column group and said second predetermined transfer rate is proportional to a second rate of image motion relative to said second column group.

8. Apparatus, as claimed in claim 7, wherein a line connecting a point in the array with a point in said scene is substantially perpendicular to a vector intersecting said line and defining said predetermined direction of image motion, and wherein said transfer rates are inversely proportional to the distances between said array and different parts of said scene along said line.

9. Apparatus, as claimed in claim 3, wherein said array, column transfer means, adjusting means and imaging means are installed in a vehicle capable of motion in a predetermined direction.

10. Apparatus, as claimed in claim 9, wherein said imaging means further comprises lens means for placing said scene on said array, said lens means having a central axis perpendicular to a vector defining said predetermined direction of vehicle motion, and wherein said predetermined transfer rate for a first point of said scene is proportional to $$\frac{FV}{D}$$

where F is the distance from said lens means to the column containing the pixel representing said first point, V is the rate of motion of the vehicle in said predetermined direction and D is the distance from said vehicle to said first point.

11. Apparatus, as claimed in claim 5, and further comprising a discrete array of diode detector elements.

12. Apparatus, as claimed in claim 1, wherein said array comprises a charge injection device.

13. Apparatus for processing pixel information representing an image of a scene comprising at least a first image portion and a second image portion, said apparatus compensating for image motion in a predetermined direction and comprising:
an array of cells capable of storing said pixel information corresponding to said at least first image portion and second image portion of said scene, said array being arranged in rows and columns; and
column transfer means for transferring pixel information corresponding to said first image portion at a first predetermined transfer rate and for transferring pixel information corresponding to said second image portion at a second predetermined transfer rate different from said first predetermined transfer rate, said column transfer means comprising;
means for organizing said columns of said array into at least a first column group storing pixel information corresponding to said first image portion and a second column group storing pixel information corresponding to said second image portion;
two or more transfer control circuits, each of said transfer control circuits transferring pixel information in one of said at least first and second column groups and comprising a master clock providing clock signals at a master clock frequency and a counter and a clock driver, said clock driver transferring pixel information in one of said at least first and second column groups when said counter counts a predetermined number of counts in response to said clock signals; and
adjusting means for adjusting said predetermined transfer rates depending on the changes in rates of motion of said at least first and second image portions relative to said array.

14. Apparatus, for processing pixel information representing an image of a scene which compensates for image motion in a predetermined direction comprising:
an array of cells capable of storing said pixel information corresponding to said scene, said array being arranged in rows and columns;
column transfer means for organizing said columns of the array into one or more column groups and for transferring pixel information located in said one or more column groups at one or more predetermined transfer rates depending on the rate of motion of portions of said image relative to said array, said column transfer means comprising a master clock providing clock signals at a master clock frequency and one or more transfer control circuits responsive to said clock signals, each of said column transfer control circuits transferring pixel information in one of said one or more column groups, each of said transfer control circuit comprising a counter and a clock driver, said clock driver transferring pixel information in one of said one or more column groups when said counter counts a predetermined number of counts; and
adjusting means for adjusting said one or more predetermined transfer rates depending on the changes in rate of motion of said image relative to said array and for providing said predetermined number of counts to each of said counters.

15. Apparatus, as claimed in claim 14, wherein said predetermined number of counts provided to each of counter of each column group is proportional to $$\frac{X}{f_i}$$

where X is said master clock frequency and $f_i$ is said predetermined transfer rate for each column group.

16. Apparatus for processing pixel information representing an image of a scene which compensates for image motion in a predetermined direction comprising:
an array of cells capable of storing said pixel information corresponding to said scene, said array being arranged in rows and columns; and
column transfer means for organizing said columns of the array into one or more column groups and for transferring pixel information located in said one or more column groups at one or more predetermined transfer rates depending on the rate of motion of portions of said image relative to said array, said one or more column groups comprising a first column group and a second column group, said one or more predetermined transfer rates including a first predetermined transfer rate proportional to a first rate of image motion relative to said first column group and a second predetermined transfer rate proportional to a second rate of image motion relative to said second column group, said predetermined transfer rates varying monotonically from one column group to the next across said array.

17. Apparatus for processing pixel information representing an image of a scene which compensates for image motion in a predetermined direction comprising:

an array of cells capable of storing said pixel information corresponding to said scene, said array being arranged in rows and columns; and column transfer means for organizing said columns of the array into N column groups, including a first column group, and for transferring pixel information at a predetermined transfer rate for each column group, $f_i$, proportional to the image motion relative to said array by being proportional to $$f_1+(i-1)(f_n-f_1)/(n-1)$$

where i is an integer between 1 and N, $f_1$ is the transfer rate for the first column group, and $f_n$ is the transfer rate for the $n^{th}$ column group, $f_1$ and $f_n$ being previously determined.

18. Apparatus carried by an aircraft capable of motion in a predetermined direction and defining a reference plane that is horizontal during level-flight, said apparatus being capable of processing pixel information representing an image of a scene forward of said aircraft and of compensating for image motion in said predetermined direction comprising:

an array of cells installed in said aircraft capable of storing said pixel information corresponding to said scene, said array being arranged in rows and columns, said columns of said array defining a column direction;

imaging means installed in said aircraft for placing said image on said array, said imaging means comprising a lens having a focal length and having a central axis making a forward depression angle $\phi$ with said reference plane;

column transfer means installed in said aircraft for organizing said columns of said array into at least one column group and for transferring pixel information located in said at least one column group at least one predetermined transfer rate depending on the rate of motion of portions of said image relative to said array, said at least one column group having pixel information which is transferred at one transfer rate that is proportional to $$\frac{F}{P_x}\frac{V}{H}\sin^2(\phi\pm\Theta_i)$$

where

F is the focal length of said lens, $P_x$ is the pixel size in said column direction, V is the velocity of said aircraft, H is the height of said aircraft above said scene, and ($\phi\pm\Theta_i$) is the forward depression angle of the point chosen for synchronization for forward motion correction; and adjusting means installed in said aircraft for adjusting said at least one predetermined transfer rate depending on the change in rate of motion of said image relative to said array.

19. In a system comprising an array of cells arranged in rows and columns for storing pixel information representing at least first and second simultaneously occurring image portions of a scene, said array storing pixel information corresponding to said first image portion in a first column of said columns and storing said pixel information corresponding to said second image portion in a second column of said columns, a method of processing said pixel information in order to compensate for image motion in a predetermined direction comprising the steps of:

transferring in said array said pixel information representing said first image portion in said first column at a first predetermined transfer rate; and transferring in said array said pixel information representing said second image portion in said second column at a second transfer rate different from said first transfer rate, whereby resolution of an image created from said pixel information can be improved.

20. The method, as claimed in claim 19 and further comprising the step of:

adjusting said first and second predetermined transfer rates depending on the changes in rate of motion of said first and second image portions relative to said array.

21. The method, as claimed in claim 20, and further comprising the step of placing said image on said array.

22. The method, as claimed in claim 21, and further comprising the steps of:

placing said image on said array during a predetermined exposure period; and transferring pixel information within said array during said predetermined exposure period.

23. The method, as claimed in claim 19, wherein said array is a charge-coupled device.

24. The method, as claimed in claim 20, wherein the step of transferring pixel information comprises:

organizing said columns of said array into at least a first column group storing pixel information corresponding to said first image portion and a second column group storing pixel information corresponding to said second image portion; and transferring pixel information in said at least first and second column groups at different transfer rates.

25. The method, as claimed in claim 19, and further comprising the step of organizing said columns of said array into a plurality of column groups including a first column group and a second column group, wherein said first predetermined transfer rate is proportional to a first rate of motion of said first image portion relative to said first column group and wherein said second predetermined transfer rate is proportional to a second rate of image motion of said second image portion relative to said second column group.

26. The method, as claimed in claim 25, wherein a line connecting a point in said array with a point in said scene is substantially perpendicular to a vector intersecting said line and defining said predetermined direction of image motion, and wherein said transfer rates are inversely proportional to the distances between said array and different parts of said scene along said line.

27. The method, as claimed in claim 21, wherein said array is installed in a vehicle capable of motion in a predetermined direction and the steps of transferring are performed aboard said vehicle.

28. The method, as claimed in claim 27, wherein the system further comprises lens means for placing said scene on said array, said lens means having a central axis perpendicular to a vector defining said predetermined direction of vehicle motion, and wherein the step of transferring comprises the step of calculating said predetermined transfer rate for a first point of said scene to be proportional to $$\frac{FV}{D}$$

where F is the distance from the lens means to the column containing the pixel representing the first point, V is the rate of motion of the vehicle in said predetermined direction and D is the distance from said vehicle to said first point.

29. The method, as claimed in claim 23, and further comprising a discrete array of diode detector elements.

30. In a system comprising an array of cells capable of storing pixel information representing at least first and second image portions of a scene, said array being arranged in rows and columns, a method of processing said pixel information in order to compensate for image motion in a predetermined direction comprising the steps of:

transferring in said array said pixel information representing said first image portion at a first predetermined transfer rate:

transferring in said array said pixel information representing said second image portion at a second transfer rate different from said first transfer rate, said step of transferring pixel information comprising the steps of organizing said columns of said array into at least a first column group storing pixel information corresponding to said first image portion and a second column group storing pixel information corresponding to said second image portion:

transferring pixel information in said at least first and second column groups at different transfer rates:

providing clock signals at a master clock frequency; and initiating transfer of pixel information in each of said at least first and second column groups in response to said clock signals by counting a predetermined number of counts for that column group: and adjusting said first and second predetermined transfer rates depending on the changes in rate of motion of said first and second image portions relative to said array, whereby resolution of an image created from said pixel information can be improved.

31. The method, as claimed in claim 30, wherein said predetermined number of counts provided for each of said at least first and second columns groups is proportional to $$\frac{X}{f_i}$$

where X is said master clock frequency and $f_i$ is said predetermined transfer rate for each of said at least first and second column groups.

32. In a system comprising an array of cells capable of storing pixel information representing an image, said array being arranged in rows and columns, a method of processing said pixel information in order to compensate for image motion in a predetermined direction comprising the steps of:

organizing said columns of said array into at least a first column group and a second column group; and transferring pixel information located in said first column group at a first predetermined transfer rate proportional to a first rate of image motion relative to said first column group and transferring pixel information in said second column group at a second predetermined transfer rate different from said first predetermined transfer rate proportional to a second rate of image motion relative to said second column group, said predetermined transfer rates varying monotonically from one column group to the next across the array.

33. In a system comprising an array of cells capable of storing pixel information representing an image, said array being arranged in rows and columns, a method of processing said pixel information in order to compensate for image motion in a predetermined direction comprising the steps of:

organizing said columns of said array into N column groups, including a first column group, and transferring pixel information at a predetermined transfer rate for each column group, $f_i$, proportional to the image motion relative to said array by being proportional to $$f_1 + (i-1)(f_n - f_1)/(n-1)$$

where i is an integer between 1 and N, $f_1$ is the transfer rate for said first column group, and $f_n$ is the transfer rate for said $n^{th}$ column group, $f_1$ and $f_n$ being previously determined.

34. In a system comprising an array of cells capable of storing pixel information representing an image, said array being arranged in rows and columns, said columns defining a column direction, said array being installed in an aircraft defining a reference plane that is horizontal during level flight, said system further comprising a lens having a focal length and a central axis, said central axis making a depression angle $\phi$ with said reference plane, a method of processing pixel information representing a scene in order to compensate for image motion in a predetermined direction comprising the steps of:

organizing said columns of said array into at least one column group;

transferring pixel information located in said at least one column group at least one predetermined transfer rate depending on the rate of motion of portions of said image relative to said array, said at least one column group having pixel information which is transferred at one transfer rate, f, that is proportional to $$\frac{F}{P_x} \frac{V}{H} \sin^2(\phi \pm \Theta_i)$$

where
F is the focal length of said lens,
$P_x$ is the pixel size in said column direction,
V is the velocity of said aircraft,
H is the height of said aircraft above said scene, and
$(\phi \pm \Theta_i)$ is the forward depression angle of the point chosen for synchronization for forward motion compensation:

adjusting said at least one predetermined transfer rate depending on the change in rate of motion of said image relative to said array; and placing said image on said array;

wherein said scene is forward of said aircraft and said steps of organizing and transferring are performed aboard said aircraft.

* * * * *